(12) United States Patent
Shaffer et al.

(10) Patent No.: US 6,546,087 B2
(45) Date of Patent: Apr. 8, 2003

(54) METHOD AND SYSTEM FOR ENABLING QUEUE CAMP-ON FOR SKILLS-BASED ROUTING

(75) Inventors: Shmuel Shaffer, Palo Alto, CA (US); William J. Beyda, Cupertino, CA (US); Randall P. Wuerfel, Santa Clara, CA (US)

(73) Assignee: Siemens Information & Communication Networks, Inc., Boca Raton, FL (US)

( * ) Notice: Subject to any disclaimer, the term of this patent is extended or adjusted under 35 U.S.C. 154(b) by 0 days.

(21) Appl. No.: 09/788,089

(22) Filed: Feb. 16, 2001

(65) Prior Publication Data

US 2002/0114432 A1 Aug. 22, 2002

(51) Int. Cl.[7] .............................................. H04M 11/00
(52) U.S. Cl. ............................. 379/90.01; 379/265.12; 379/209.01
(58) Field of Search .................... 379/90.01, 265.01, 379/265.12, 266.01, 265.04, 265.06, 265.03, 210.01, 93.24, 265.11, 265.02, 209.01; 709/205, 203, 204; 707/3; 455/414

(56) References Cited

U.S. PATENT DOCUMENTS

| | | | |
|---|---|---|---|
| 5,268,957 A | 12/1993 | Albrecht ........................ 379/67 |
| 5,311,574 A | 5/1994 | Livanos ......................... 379/88 |
| 5,594,902 A | 1/1997 | Nishigaya et al. ........... 395/672 |
| 5,742,674 A | 4/1998 | Jain et al. .................... 379/209 |
| 5,825,869 A | 10/1998 | Brooks et al. | |
| 5,991,394 A | * 11/1999 | Dezonno et al. ........ 379/265.01 |
| 6,167,395 A | * 12/2000 | Beck et al. ..................... 707/7 |
| 6,295,551 B1 | * 9/2001 | Roberts et al. .............. 709/205 |
| 6,411,805 B1 | * 6/2002 | Becker et al. ......... 379/209.01 |

FOREIGN PATENT DOCUMENTS

| | | |
|---|---|---|
| EP | 0740445 | 4/1996 |
| EP | 0740450 | 4/1996 |
| EP | 0909082 | 8/1998 |
| EP | 1030504 | 8/2000 |
| WO | 99/14930 | 3/1999 |
| WO | 99/41895 | 8/1999 |

* cited by examiner

*Primary Examiner*—Melur Ramakrishnaiah

(57) ABSTRACT

In an automated call management method and system, automated processing is used to collect customer information that enables skills-based call routing and a camp-on approach to efficiently handling calls. The customer information is preferably acquired through use of a web-compatible form that is submitted by the customer. The form includes information that identifies agent attributes that are considered advantageous to handling a particular call, includes the callback telephone number, and may include the time at which the callback should be initiated. In another embodiment, the information is acquired using interactive voice recognition techniques. After an agent queue is selected on the basis of a correlation between identified agent attributes and the skills of a particular agent or agent group, a camp-on request is generated to initiate a connection when an appropriate agent is available.

19 Claims, 5 Drawing Sheets

METHOD AND SYSTEM FOR ENABLING QUEUE CAMP-ON FOR SKILLS-BASED ROUTING

BACKGROUND OF THE INVENTION

The invention relates generally to call-management methods and systems for providing automated call distribution capabilities and more particularly to methods and systems for cost effectively connecting agents of the systems to customers or potential customers.

DESCRIPTION OF THE RELATED ART

Automatic call distribution (ACD) systems are used in applications such as providing product support call management for products of a company, providing customer service call management for handling questions relating to a particular service or the billing for the particular service, and providing marketing call management for the sale of goods or services of a company. An ACD system may be physically located on the premises of the company or may be on the premises of a central service provider, such as a regional telephone company. ACD agents for handling outgoing and incoming calls may be employees of the company or may be employees of a business enterprise that conducts call-handling services for a number of unrelated companies. The ACD agents may be located at a single office or may be distributed among a number of offices and/or homes (telecommuters).

Inbound transactions are calls initiated by customers and directed to ACD agents. On the other hand, outbound transactions are calls initiated by the agents to customers or prospective customers. An ACD system must select a strategy for distributing the inbound transactions to the ACD agents. One approach to the agent selection decision is to set up a sequencing scheme so that the same sequence of agents is followed until the first available agent in the sequence is found. The inbound transaction is then directed to this first available agent. The concern with the approach is that it creates "hot seats," i.e., an inequitable distribution of inbound transactions to the ACD agents who are high in the sequence. Thus, an alternative approach is to use a longest-idle-agent approach to provide a more equitable distribution of transactions.

In many call-management environments, agents are not equally adept at handling all types of transactions. For example, some transactions of a particular ACD system may require knowledge of a language other than the native language of the country in which the system is located. As another example, some transactions may require the expertise of "specialists" having training in the specific field to which a transaction relates, since training all agents to be knowledgeable in all areas would be cost-prohibitive. Therefore, a computer software company may have specialists in the area of a database product and specialists in the area of a word processing product. The agents may be assigned to different groups or departments on the basis of their specialties. Even within a group, there are often more highly trained agents and less experienced agents. Ideally, the highly skilled agents handle only those transactions that require a greater-than-average skill level.

Skills-based transaction routing requires knowledge of the individual call-handling skills of the various agents. U.S. Pat. No. 5,825,869 to Brooks et al., which is assigned to the assignee of the present invention, describes a skills-based routing scheme. A resume is formed for each ACD agent. The resume includes data that is indicative of the call-handling capabilities of the agent and includes data that is indicative of any preferences of the system for particular individuals to process particular types of calls. When an inbound call is received, the call is tagged with identifications of abilities that are considered to be advantageous to processing the call. As a result, the skills of the agents can be correlated with the desired skills for handling the inbound call.

Skills-based routing provides a significant improvement over prior techniques for distributing calls among agents. However, the matching of the needed skills for handling a call with the resume information of the agents is not an instantaneous process. The correlation requires access to at least one database, since the resumes are typically stored in a database format. For situations in which the system determines desired call-handling skills for a particular call by accessing information regarding the caller (e.g., has the caller previously spoken with a particular agent regarding the same problem), a customer database needs to be accessed. Typically, the caller is placed on hold while the correlation process is implemented. For some calls, this requires either the caller or the company operating the ACD system to incur toll charges. Additionally, the telecommunication resources of the ACD system are unavailable for other uses while the call is on hold. If no agent having the necessary call-handling skills is immediately available, the toll charges continue to accrue. Moreover, the telecommunications resources continue to be allocated to the call.

A solution is to request that the calling party terminate the first call and make a second attempt after a set period of time. This may leave some customers dissatisfied. Moreover, there is no assurance that the appropriate agent will be available when the second call is completed, so that even the second call may be required to be placed on hold.

What is needed is a call-management method and system which efficiently utilize the resources of a call distribution capability, while ensuring satisfactory service to callers.

SUMMARY OF THE INVENTION

Call management utilizes automated processing to collect information from individuals, to identify agent attributes advantageous to handling calls involving the individuals, to correlate the identified agent attributes with stored attribute data regarding agents, and to employ camp-on techniques in establishing call sessions between the individuals and agents that are specified in the correlation process. In the preferred embodiment of the invention, the process of collecting information includes enabling the individuals to enter information as user data via data connections that are separate from the call sessions. In the most preferred embodiment, the user data entered by an individual is received as a submission of a completed web-based form. The information from the web-based form is used in the correlation process, so that the automated camp-on techniques may be used when the appropriate agent or agent group queue is determined. While the web-based format is preferred, the information may be collected by other automated processes, such as through use of an interactive voice recognition (IVR) device.

For applications in which the information is collected as entries into forms, automated call distribution (ACD) capability is enabled by cooperation of a web-based system, a skills-based routing system, and a telephony-based system. Within the web-based system, a server provides access to the form and buffers the completed form. The server may also be used to translate the form, but translation may alternatively be performed at the skills-based resume routing system. If the telephony-based system is a conventional system, such as a private branch exchange (PBX), the information may be exchanged using an integrated services digital network (ISDN) user-to-user signaling field or a call-independent signaling connection in the appropriate network protocol (QSIG). On the other hand, if the invention is implemented in a telephony-over-local area network (ToL), all of the information may be passed over the data network.

The skills-based resume routing system includes a store of attribute data regarding the call-handling skills of particular agents. When information is received as a result of a submission of a web-based form, the correlation process is initiated. On the basis of the correlation, an agent or group of agents is selected. The web-based form also includes the telephone number that is to be used to contact the individual who submitted the form. In the preferred embodiment, the form also allows the individual to select a time at which a callback is to be made. At the appropriate time, a camp-on request to the appropriate agent group queue is generated. As previously noted, the camp-on request may be transmitted in an ISDN user-to-user signaling field or on a QSIG call-independent signaling connection. A company with multiple call centers can then route the camp-on request to the correct location on the basis of desired call-handling skills and the location of the caller. This reduces the likelihood that a call will occur from an incorrect call center, which would then incur toll charges to transfer the call to the correct call center. The calling individuals are not kept on hold, but are called back when an appropriate agent is available, thereby efficiently using telecommunications resources and reducing toll costs.

While the web-based embodiment is preferred, other embodiments are contemplated. For example, in order to provide similar functionality for conventional phone calls to either a PBX or ToL-based ACD system, the original telephone calls can be routed to an interactive voice response (IVR) device. The caller then answers IVR prompts that solicit the information needed to enable the skills-based resume routing capability. If necessary, the IVR could prompt the caller for a telephone number to which the callback should be made (note that the caller can simply confirm a previously determined callback number). Optionally, a callback time is also acquired. Following the information-gathering original call, telecommunications resources are freed and toll charges are no longer accumulated. The skills-based resume routing system determines the appropriate agent or agent group queue on the basis of the correlations between the gathered information and the stored attribute data for the individual agents. The camp-on request is then processed in the same manner as the web-based embodiment.

DETAILED DESCRIPTION

Figure 1:
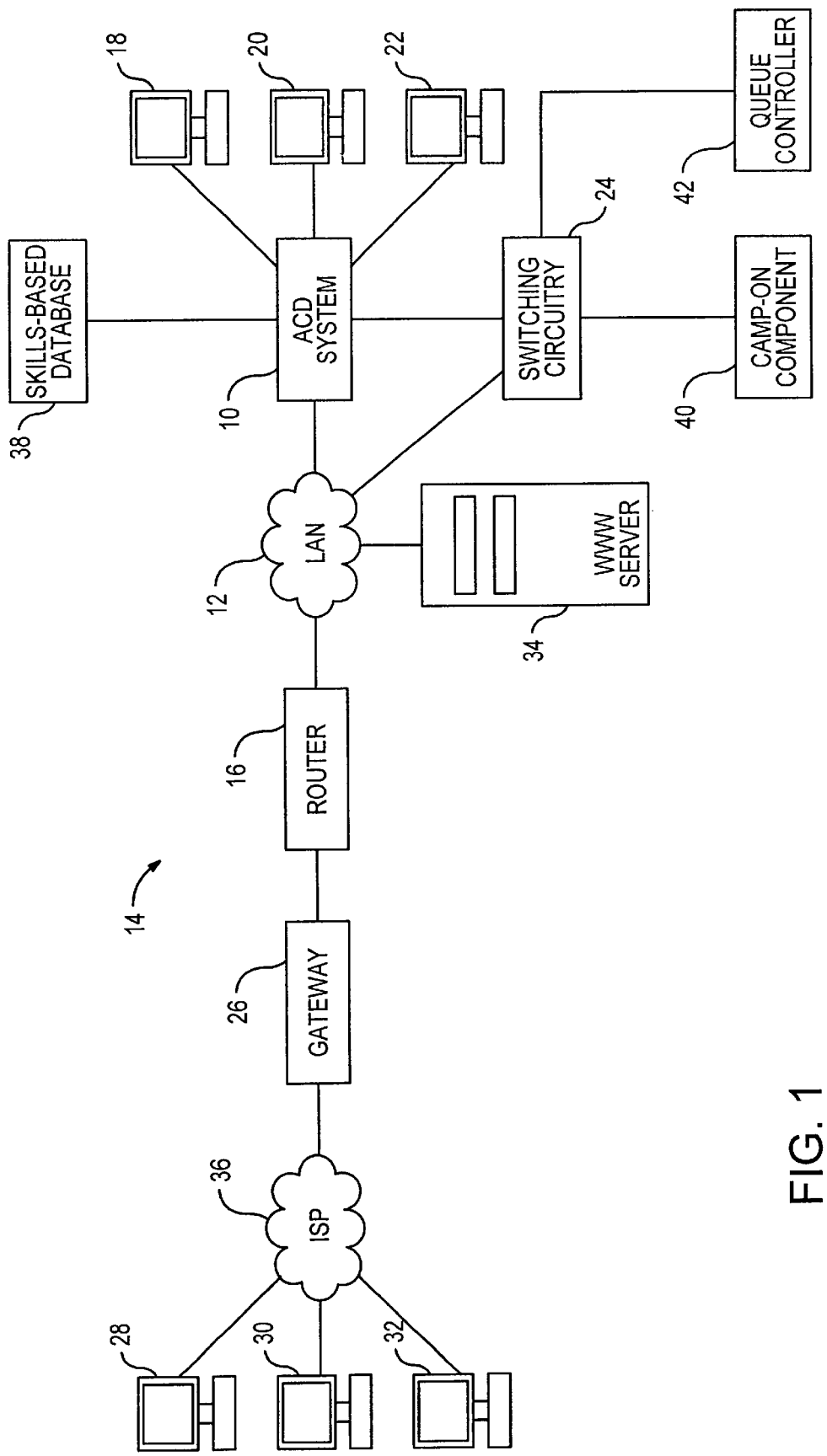
FIG. 1 is a schematic diagram of a ToL system for enabling queue camp-on within skills-based resume routing in accordance with one embodiment of the invention.

With reference to FIG. 1, an automatic call distribution (ACD) system 10 is located on a data network which is equipped for voice communications. In one embodiment, the data network is a Local Area Network (LAN) 12. In this embodiment, the system of FIG. 1 would be a telephony-over-LAN (ToL) 14. A router 16 cooperates with switching circuitry 24 to provide routing functions for a number of telephony-enabled computers 18, 20 and 22. Often, the router and switching circuitry are integrated into a single component.

The telephony-enabled computers 18, 20 and 22 are utilized by ACD agents of the company which operates the ACD system 10. Optionally, telephones may be substituted for the telephony-enabled computers.

A gateway 26 provides protocol conversion functions that enable communication between the ACD agent computers 18, 20 and 22 and computers 28, 30 and 32 of potential customers. It is not critical that the customer computers are telephony enabled, since the computers need only communicate with a web-based server 34 and standard telephones may be used by the customers to receive a callback. In one application, the server 34 includes catalog information that may be accessed by customers via one or more Internet Service Providers (ISPs) 36, as is well known in the art. As another example, the ACD system 10 may be designed for a product support application in which customers are interested in receiving information regarding a product which has been previously purchased.

A customer at one of the external computers 28, 30 and 32 may enter information into a web-based form that is buffered at the server 34 of the ToL 14. The information functions as a "request" for a callback from an ACD agent who is sufficiently skilled to handle a particular call. A "skill" is an area of expertise in which an agent has competence or experience. The skill may be related directly to a service or product (e.g., a word processing program) or may only indirectly be related to the service or product (e.g., the ability to speak a particular language of the customer).

The ACD system 10 is shown as being connected to a skills-based database 38. The format of the database is not critical to the invention. In fact, the "resume" information regarding the individual ACD agents may be stored in a format other than a database. While not critical, the skills levels may be ratings on a scale of 1 to 9, with 9 indicating the greatest level of expertise with regard to a particular skill. The previously cited patent to Brooks et al. describes one possible implementation of a skills-based database. The teachings of the Brooks et al. patent are incorporated herein by reference.

The switching circuitry 24 is shown as being connected to a camp-on component 40 and a queue controller 42. The camp-on capability allows an automated connection between an ACD agent computer 18, 20 and 22 and a customer. The camp-on service is implemented when connectivity between two telephony-enabled devices (such as conventional telephones or properly programmed computers) is to be established as soon as both devices are available. Thus, if an agent queue that is indicated by the skills-based database 38 as having agents best suited for a particular call includes no presently available agent, the camp-on component 40 will function to automatically provide connectivity to the next-available agent within the queue. The queue controller 42 coordinates operations involving call requests and call dispatches.

Figure 2:
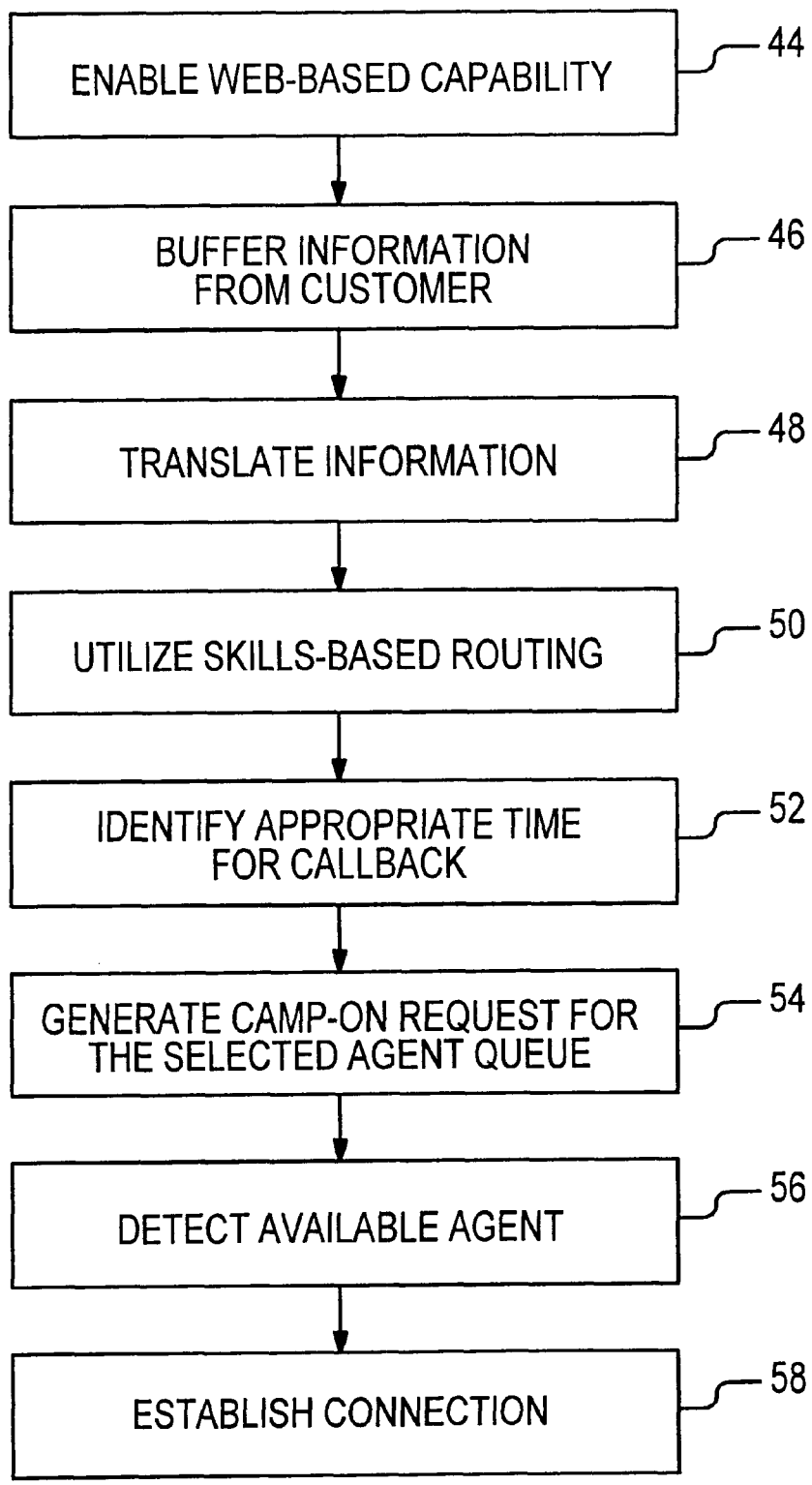
FIG. 2 is a sequence of steps for utilizing the invention with the system of FIG. 1.

FIG. 2 is a process flow of steps for utilizing the camp-on capability for skills-based routing in accordance with the embodiment of FIG. 1. At step 44, the web server 34 is enabled. In the preferred embodiment, the information from customers is submitted in a format compatible with web-based forms. This may be accomplished in a number of alternative manners. For example, the form may be downloaded to a customer at one of the computers 28, 30 and 32 for completion and return in an intact condition. Alternatively, the submission of information from one of the customer computers may only include the information that is entered by the customer. As a third alternative, the form may be one in which a sequence of questions is presented to the customer, who responds to a question before the next question is available. The sequence may be fixed or may be at least partially based upon prior answers.

At step 46, the information that is received from the customer is buffered. In one embodiment, the customer at one of the computers 28, 30 and 32 enters information into a conventional Internet screen form (in some embodiments, the customer may enter information into a WAP-based Internet screen form of a mobile phone or personal digital assistant device). The entered information includes the telephone number of the customer and may include an indication as to when a return call is to be made to the customer. In this embodiment, the entered information may be placed in a packet, which may be referred to as a customer request packet (CRP). The CRP is transmitted to the web server 34. The buffered information is then translated at step 48 to a format that is compatible with communication between the web server and the ACD system 10. As examples, the server and the ACD system may exchange information in an ISDN user-to-user signaling field or a QSIG call-independent signaling connection.

The order of steps 50, 52 and 54 depends upon the assignment of tasks to the components of FIG. 1. Thus, if the step 54 of generating the camp-on request is executed at the server 34, the step 54 precedes the step 50 of utilizing skills-based routing. The order shown in FIG. 2 represents an application in which information transmitted from the server 34 to the ACD system 10 includes the skills-based information submitted by the customer and any information regarding the time of the requested callback. Thus, the information is transmitted from the server 34 to the ACD system 10 for implementing the skills-based routing at step 50, allowing the ACD system to control the generation of the camp-on request at the appropriate time for callback.

Within step 50, the skills-based resume routing process is executed. The resume routing capability may be incorporated into the ACD system 10 or may be an adjunct component. At step 52, the appropriate time for callback is determined. There is a possibility that the callback will occur on a day other than the one in which the information was submitted by the customer. At the other extreme, the process may be set up to provide the option of allowing the calling customer to wait in queue for an appropriate agent. Offering this option of waiting in queue may be based on the load level and wait times currently being experienced by callers. That is, below some threshold of caller wait times, the customers may be allowed to wait in queue. However, once the threshold is reached, the system may determine that it is more cost effective to implement callbacks, rather than incurring the toll charges and/or taking the risk that customers will abandon their queued calls.

After the skills-based routing step 50 identifies the appropriate agent queue and after the appropriate time is identified at step 52, the camp-on request is generated at step 54. For example, the ACD system 10 may send an H.323 camp-on request containing the telephone number of the customer to the camp-on component 40 of the switching circuitry 24. In step 56, the availability of an agent in the agent queue is detected. The customer is then signaled and the call connection is established at step 58.

For a company that operates multiple call center sites, the camp-on request may be routed to the most advantageous site. This reduces occurrences in which a call is started at one site, but then must incur additional toll charges in order to be transferred to a different site. By intelligently using camp-on requests, callers are not kept on hold until a particular ACD agent queue has become available. As a result, telecommunications resources are freed and toll charges are reduced.

Figure 3:
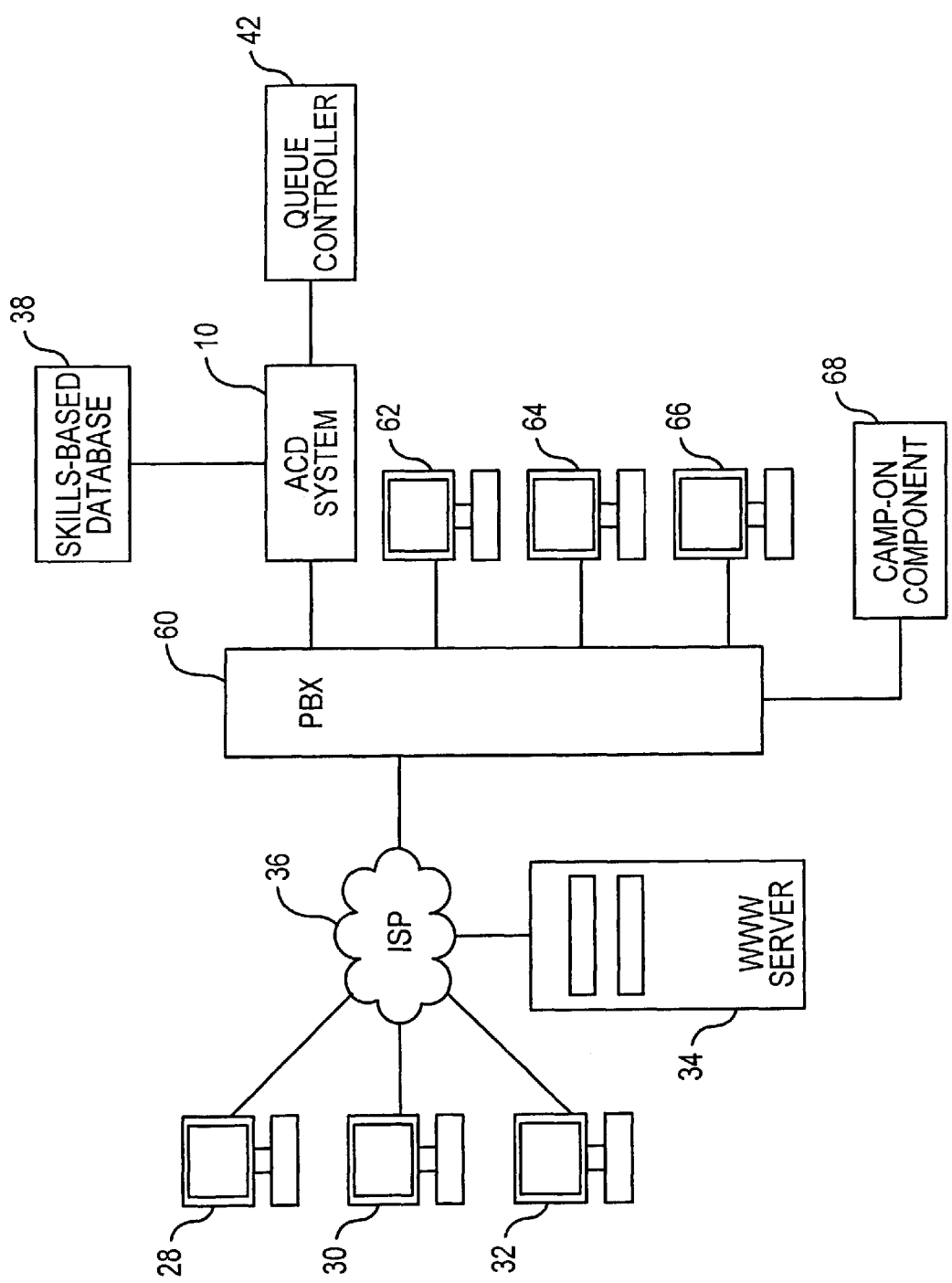
FIG. 3 is a schematic diagram of a PBX system that enables camp-on with resume routing in accordance with a second embodiment of the invention.

FIG. 3 illustrates an alternative embodiment of a system for implementing the invention. In this embodiment, the customer computers 28, 30 and 32 still submit information by means of entering the information into web-based forms, but the telecommunications system is PBX-based, rather than being ToL-based. The web-based forms are accessible from a web server 34 via an ISP 36. A PBX 60 is connected to a number of ACD agent workstations 62, 64 and 66. The workstations may be telephony-enabled computers or may be telephones. The workstations preferably allow the customer information to be presented to an agent, so that the agent is aware of the interests of the customer.

A camp-on component 68 is shown as being a separate device from the PBX 60, but may be integrated into the PBX. Also connected to the PBX is the ACD system 10 of the type described with reference to FIG. 1. The ACD system has access to the information stored in the skills-based database 38 and to the.capabilities provided by the queue controller 42.

In the operation of the system of FIG. 3, the steps that were described with reference to FIG. 2 are followed, but with some modifications. The web server 34 is connected to the PBX 60 to enable the web-based capability. The connection may be an ISDN or QSIG related line. The CRP (i.e., customer request packet) is embedded in the user-to-user signaling information field of the ISDN signaling element or the QSIG call-independent signaling connection. As an alternative to transmitting the CRP directly to the PBX 60, the CRP may be sent over any standard LAN to the PBX or may be transmitted directly to the skills-based ACD system 10.

After the skills-based routing for a particular request is utilized at step 50, the camp-on request is generated at step 54, presuming the time identified at step 52 has been reached. If the system includes more than one PBX, the camp-on request is transmitted to the appropriate PBX with the desired agent group queue. The camp-on request includes the telephone number of the customer. The transmission to a remote PBX occurs via an ISDN user-to-user signaling element or a QSIG call-independent signaling connection. At step 56, the availability of an agent within the designated agent group is detected, so that a connection can be established between the available agent and the customer at step 58.

Figure 4:
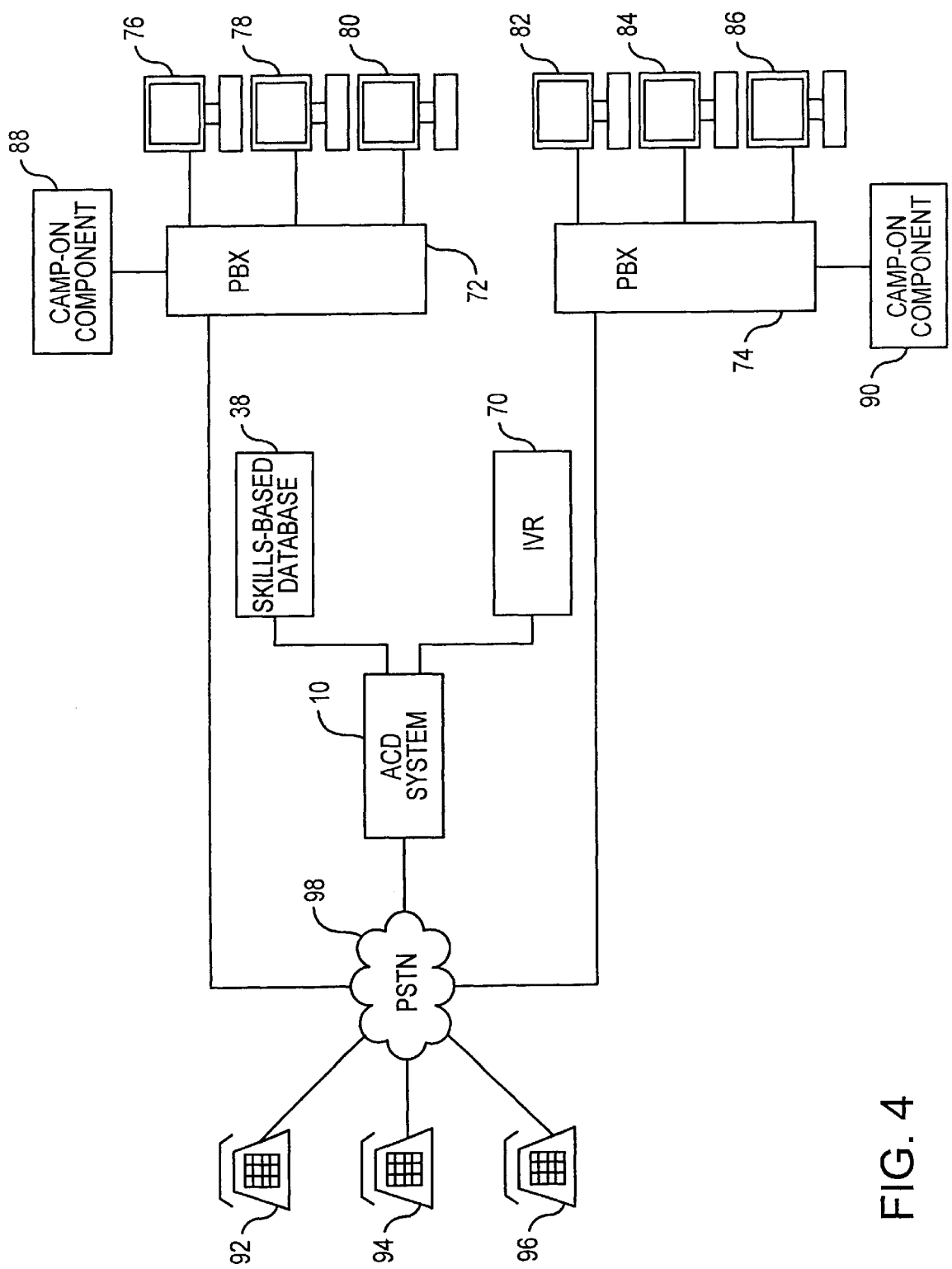
FIG. 4 is a schematic diagram of a third embodiment of a system having camp-on capability within skills-based resume routing.

FIG. 4 illustrates another embodiment of the invention. In this embodiment, information is collected from consumers in a manner that does not include web-compatible forms. Nevertheless, the information is collected using automated processing. In one embodiment, the automated processing involves use of an interactive voice response (IVR) device

70. Thus, a calling customer responds to IVR prompts, enabling the system to determine the type of skills that are advantageous to handling the call with the customer. The prompts may include a request to designate a time at which a callback is to occur. The telephone number of the calling customer is necessary. The telephone number may be acquired using known automatic number identifier (ANI) techniques, so that the customer need only confirm that the callback should be made to the same number. Alternatively, the IVR prompts may solicit the telephone number to be called.

In the embodiment of FIG. 4, the invention is used in an application in which there is more than one PBX 72 and 74. However, the techniques may be used in.applications in which there is a single PBX or there are more than two PBXs. As another alternative, the IVR device 70 may be incorporated into a ToL system, such as the one described with reference to FIG. 1. The PBX 72 supports a number of ACD agent workstations 76, 78 and 80, while the PBX 74 supports another set of ACD agent workstations 82, 84 and 86. Each PBX is connected to a camp-on component 88 and 90.

The IVR device 70 is connected to the ACD system 10, which has access to information within the skills-based database 38. The IVR device is shown as being connected to receive information from customer telephones 92, 94 and 96 only after the information has passed through the ACD system. However, the IVR device 70 may be connected to the public switched telephone network (PSTN) 98 separately from the ACD system 10.

Figure 5:
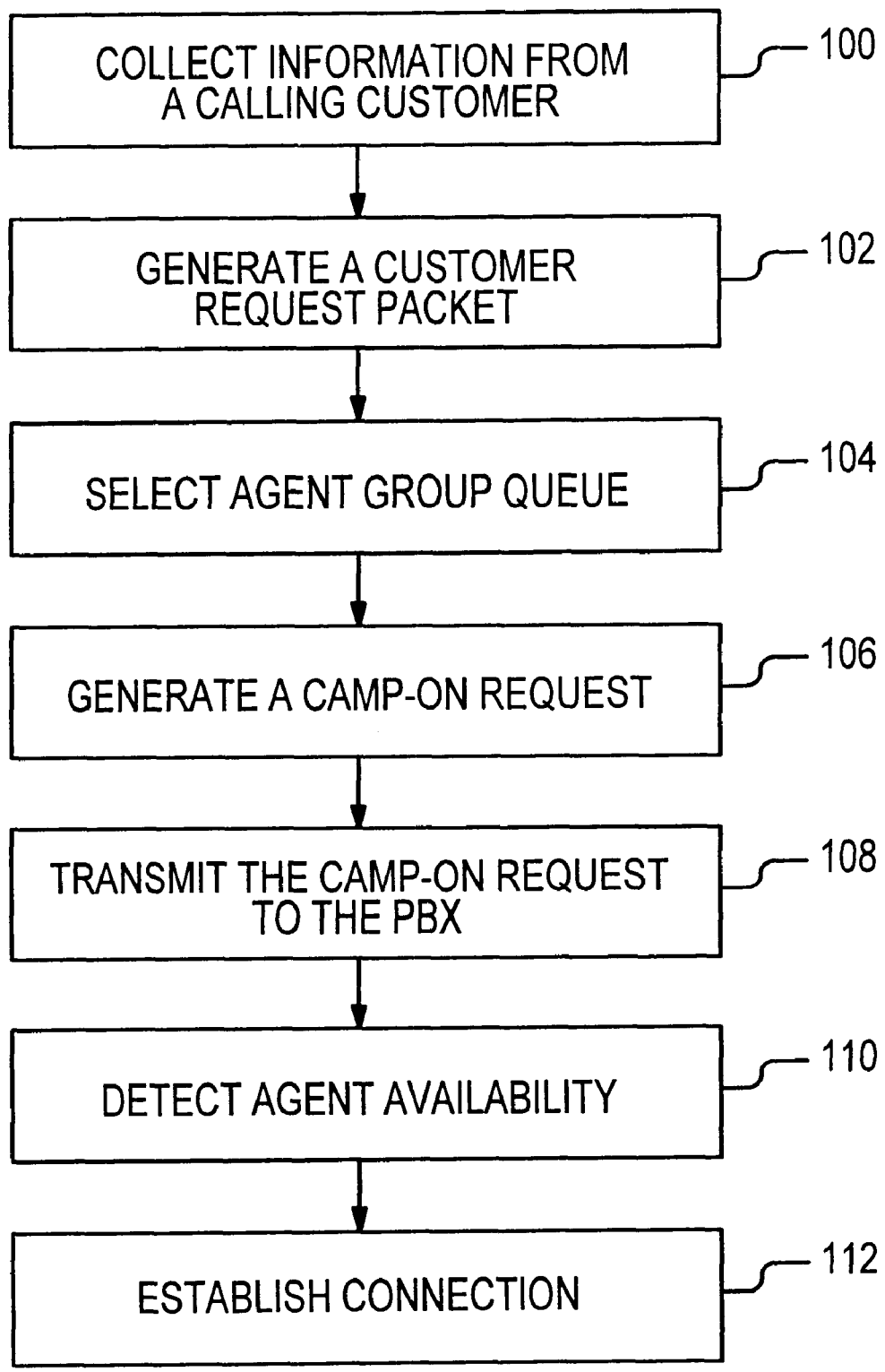
FIG. 5 is a sequence of steps for utilizing the invention with the system of FIG. 4.

The sequence of steps that may be followed in operating the system of FIG. 4 will be described with reference to FIG. 5. At step 100, information is collected from the customer at one of the customer telephones 92, 94 and 96. The information is acquired using automated techniques, such as IVR prompts from the IVR device 70. Moreover, ANI may be used to acquire the telephone number of the customer, with an IVR prompt merely being used to confirm the number. In addition to the information required for matching agent skills to desired call-handling skills, the information that is collected at step 100 may include a time at which the customer prefers that the callback be made.

After determining the callback number, the call is cleared and the ACD system 10 generates a customer request packet, as indicated at step 102. The customer request packet is passed to the skills-based routing system, if it is separate from the ACD system. Based upon the information that is acquired at step 100, an agent queue is selected at step 104.

The ACD system 10 generates a camp-on request at step 106. The camp-on request includes the identification of the agent queue selected at step 104 and includes the telephone number of the customer. If the customer indicated that a delay in the callback was preferred, the ACD system 10 may establish the delay or may include the necessary information within the camp-on request for ensuring that the delay occurs at the PBX 72 and 74 that is the target of the camp-on request. The camp-on request is transmitted at step 108 to the appropriate PBX. This request may be transmitted in an ISDN user-to-user signaling element or a QSIG call-independent signaling connection. At step 110, the availability of an agent within the selected agent queue is detected and the customer is signaled, so that the call can be established in step 112.

As an alternative to the PBX-based embodiment of FIG. 4, the IVR techniques may be employed within a ToL-based ACD system. After the routing system determines the appropriate agent queue that is to handle a customer call, the ACD system transmits an H.323 camp-on request containing the telephone number of the customer to the ToL server that supports the selected agent group queue. IVR prompts are used to collect the necessary information for selecting the agent group queue and for returning the call. When a time is indicated, the ACD system generates the camp-on request to the ToL server, so that when the agent is available the customer will be signaled and the call will be established.

While the signaling method between the skills-based routing systems and the PBX/ToL systems have been described using specific protocols (i.e., ISDN, QSIG and H.323), other protocols may be employed to provide interconnection among systems. Moreover, automated techniques other than IVR and web-compatible forms may be employed in acquiring information from customers.

What is claimed is:

1. A call-management method for distributing calls among agents for an automated request-and-respond capability comprising steps of:
   utilizing automated processing to collect information from individuals for identifying agent attributes advantageous to handling calls involving said individuals;
   utilizing automated resume routing to correlate identified agent attributes with specific said agents on a basis of stored attribute data regarding particular said agents; and
   establishing call sessions between said individuals and said agents based on correlations identified using said automated resume routing, including employing automated camp-on techniques in call sessions in which:
   (a) said agents selected for said call sessions on a basis of said correlation are not immediately available; and
   (b) said individuals of said call sessions terminate connections that were utilized in said automated processing to collect said information from said individuals.

2. The call-management method of claim 1 wherein said step of utilizing automated processing includes enabling said individuals to enter said information as user data via data connections, said data connections being separate from said call sessions between said individuals and said agents.

3. The call-management method of claim 2 wherein said step of utilizing automated processing includes enabling said individuals to complete and submit Web-based forms via said data connections, said step of establishing call sessions including generating camp-on requests in response to said Web-based forms, said camp-on requests being specific to said call sessions between said individuals and said agents.

4. The call-management method of claim 3 wherein said step of enabling said individuals to complete and submit Web-based forms includes enabling each said individual to input a choice of time at which said camp-on request is generated.

5. The call-management method of claim 3 wherein said step of utilizing automated processing includes translating and extracting said information from said Web-based forms.

6. The call-management method of claim 3 wherein:
   said step of utilizing automated processing is implemented by a Web-based system;
   said step of utilizing automated resume routing is implemented by a skills-based routing system for automatic call distribution (ACD); and
   said step of establishing call sessions is implemented by a telephony system.

7. The call-management method of claim 1 wherein said step of utilizing automated processing includes employing interactive voice recognition (IVR) techniques.

8. The call-management method of claim 7 wherein said step of employing IVR techniques includes enabling said individuals to select times at which camp-on requests are generated for establishing said call sessions.

9. The call-management method of claim 1 wherein said step of utilizing automated resume routing includes storing said attribute data as information relating to call-handling skills for a plurality of types of customer concerns, said step of utilizing automated resume routing further including selecting an agent queue for each of said call sessions on a basis of correlating said information collected from said individuals with said information relating to said call-handling skills, each said agent queue having at least one said agent associated therewith.

10. The call-management method of claim 9 wherein said steps of utilizing automated processing and utilizing automated resume routing are implemented as a customer support system.

11. A method of providing responsive calls in an automated call distribution (ACD) system comprising steps of:

collecting information from an individual regarding intended subject matter of a call session and regarding a telephone number for a call to said individual, said information being collected using automated techniques conducted via a first connection that requires system resources;

correlating said collected information with a plurality of call-handling skills of a plurality of individualized agents and selecting a particular agent queue on the basis of said correlating;

generating a camp-on request in response to said correlating, said camp-on request being specific to said telephone number and said particular agent queue; and establishing a call connection between said individual and an agent following completion of a camp-on sequence that is initiated by said camp-on request, said camp-on sequence progressing with said first connection being terminated, thereby freeing said system resources required for said first connection.

12. The method of claim 11 wherein said step of collecting information includes accessing form information submitted by said individual via a data network connection, said form information including said telephone number.

13. The method of claim 12 wherein said step of collecting information includes providing access to a Web-based form in which said information is entered.

14. The method of claim 11 wherein said step of collecting information includes soliciting and receiving a callback time at which said individual desires said call connection to occur.

15. An automated call distribution (ACD) capability comprising:

a Web-based system configured to process Web-based forms submitted by individuals requesting calls;

a skills-based resume routing system having stored attribute data regarding individualized call-handling skills of a plurality of individual agents, said Web-based system and said skills-based resume routing system being cooperative to correlate information from said Web-based forms with said stored attribute data to assign said agents to requests for said calls based on said call-handling skills of said agents; and a telephony-based system configured to execute camp-on techniques in response to a command to establish a call session between one of said individuals and one of said agents, said Web-based system and said telephony-based system being cooperative with respect to maintaining said individuals and said agents in off-hold conditions while said camp-on techniques are executed.

16. The ACD capability of claim 15 wherein said Web-based system is enabled to determine a requested call time submitted by one of said individuals and said telephony-based system is cooperative to implement said camp-on techniques at said requested call time.

17. The ACD capability of claim 15 wherein said telephony-based system is a telephony-over-local area network (ToL) in which said Web-based system is incorporated.

18. The ACD capability of claim 15 wherein said telephony system is enabled to generate a camp-on request to an agent queue for which a particular call has been assigned.

19. The ACD capability of claim 15 wherein said telephony-based system is a private branch exchange.

* * * * *